United States Patent [19]

Moss et al.

[11] 3,925,531

[45] Dec. 9, 1975

[54] PRODUCTION OF TITANIUM TETRAHALIDE

[75] Inventors: John Hickman Moss, Middlesbrough; Barrie Leng, Hartlepool, both of England

[73] Assignee: British Titan Limited, Billingham, Teeside, England

[22] Filed: Apr. 9, 1973

[21] Appl. No.: 349,454

[30] Foreign Application Priority Data

June 27, 1972 United Kingdom............... 29944/72

[52] U.S. Cl. .................. 423/76; 423/472; 423/489; 423/492; 423/610; 423/633; 423/69
[51] Int. Cl.² ................. C01G 23/02; C01G 23/06; C01G 49/06
[58] Field of Search ............ 423/489, 633, 76, 483, 423/610

[56] References Cited

UNITED STATES PATENTS

| | | |
|---|---|---|
| 2,167,784 | 8/1939 | Svendsen ........................... 423/633 |
| 2,816,815 | 12/1957 | Ruhoff et al. ................... 423/489 X |
| 2,900,234 | 8/1959 | Jackson et al. ................... 423/76 X |
| 3,107,148 | 10/1963 | Brooks .............................. 423/483 |
| 3,416,885 | 12/1968 | Honchar .............................. 423/610 |
| 3,705,007 | 12/1972 | Lichstein et al. .................... 423/489 |

FOREIGN PATENTS OR APPLICATIONS 2,060,861  6/1971  Germany ........................... 423/69

OTHER PUBLICATIONS

Jelks Barksdale, book "Titanium," 1966 Ed., p. 512, The Ronald Press Co., New York.

*Primary Examiner*—Edward Stern
*Attorney, Agent, or Firm*—Schuyler, Birch, Swindler, McKie & Beckett

[57] ABSTRACT

A process for the production of titanium tetrafluoride by heating together ferric fluoride and a iron-containing titaniferous material.

17 Claims, No Drawings

PRODUCTION OF TITANIUM TETRAHALIDE

The present invention relates to a process for the production of titanium tetrafluoride.

Titanium tetrafluoride may be converted, for example by hydrolysis to titanium dioxide, for example as described in British Specification No. 456,058 and/or in Australian Specification No. 428,758. If the titanium dioxide is produced in the form of a hydrous pulp by thermal hydrolysis, it may be converted to pigmentary titanium dioxide by calcination whereas if the material is produced by oxidation for example in the vapour phase calcination may not be necessary to develop its pigmentary properties.

If titanium tetrafluoride can be produced from a relatively cheap and plentiful source of titanium, for example from ilmenite, by methods which are themselves relatively cheap and efficient such a process will be of considerable value in the production of pigmentary titanium dioxide. Present processes for the production of pigmentary titanium dioxide require the use of raw materials which are becoming scarce and expensive such as mineral rutile (in the production of pigmentary titanium dioxide by the so-called "chloride" process wherein the rutile is first chlorinated in the presence of carbon to produce titanium tetrachloride which is, after purification, oxidised to pigmentary titanium dioxide), and/or give rise to large quantities of effluent in the production of pigmentary titanium dioxide by the "sulphate" process wherein the starting material, normally ilmenite, is digested with sulphuric acid, the resulting digestion cake containing mainly titanium and iron sulphates is dissolved in water or dilute $H_2SO_4$ and the resulting solution, normally after purification and adjustments to concentrations of iron sulphate, sulphuric acid and titanium, is thermally hydrolysed in the presence of anataseor rutile-inducing nuclei to form hydrous titanium dioxide and a mother liquor containing sulphuric acid and ferrous sulphate, the disposition of which is becoming increasingly difficult because of anti-pollution legislation.

It is an object of the present invention to provide such a process.

Accordingly, the present invention is a process for the production of titanium tetrafluoride comprising heating together ferric fluoride and an iron-containing titaniferous material and thereafter separately recovering titanium tetrafluoride and ferric oxide.

Ferric fluoride and the iron-containing titaniferous material are normally heated together at a temperature in the range 500°C to 1,500°C and preferably at a temperature in the range 800°C to 1,100°C in dry air to produce titanium tetrafluoride and ferric oxide.

It may be of advantage to peroxidise the iron-containing titaniferous material, for example by preheating to a temperature in the range of about 700°C to 900°C in air since this appears to improve the rate of reaction, particularly at lower temperatures. The preoxidising is conveniently carried out in a fluidised bed until substantially the whole of the iron is in the ferric state.

Where the reaction takes place in the solid state, it is preferred, although the particle sizes are not critical, to provide the reactants in as finely divided form as possible, to ensure good contact between the reactants, for example having an average particle size below about 250 micron. Alternatively, and preferably, the reaction may be carried out as a gas/solid reaction in which, for example, the ferric fluoride in the form of a vapour is passed over the solid material or, preferably, through a fluidised bed of the iron-containing titaniferous material. A carrier gas, for example, nitrogen and/or carbon dioxide or other gas which is inert to the reaction, may be introduced with the gaseous reactant vapour to provide optimum reaction conditions for the gas/solid reaction in the bed.

The cheapest and most readily obtainable iron-containing titaniferous material is normally ilmenite and this is the preferred starting material for the present process although other materials, for example leucoxene, may be used, if available.

At the proposed temperature of reaction, titanium tetrafluoride is formed and separated from the iron oxide as a vapour which, after recovery, may either be condensed and, if desired, converted to an aqueous solution thereof suitable for thermal hydrolysis; or it may be retained in the vapour phase and oxidised (after appropriate purification steps, if desired) directly to pigmentary titanium dioxide.

Where effluent problems are to be avoided the ferric oxide, normally produced in a solid state of substantially the same particle size as that of the original iron-containing titaniferous material, for example in the range 76 micron to 355 micron, can be reconverted to ferric fluoride by, for example, reaction with $NH_4HF_2$ at elevated temperatures (such as one in the range 120°C to 300°C and preferably 150°C to 200°C) or by reaction with aqueous hydrogen fluoride. An intermediate product of the former reaction is believed to be the compound $(NH_4)_3FeF_6$ which decomposes on heating for example up to about 750°C and preferably up to about 500°C to a number of reaction products including ferric and ferrous fluorides (the latter normally only under non-oxidising conditions). Both these fluorides can be recycled to react with more iron-containing titaniferous material (since the ferrous fluoride, when present, appears to be converted either before or during the reaction to ferric fluoride) and the reaction products of the reaction between ferric/ferrous fluorides and the titaniferous material are similar to those of the ferric fluoride/titaniferous material reaction, at least under oxidising conditions.

The remaining products of the decomposition of $(NH_4)_3FeF_6$, i.e. $NH_4F$, $NH_3$, $HF$ and $N_2$ can also be recycled (with the possible exception of $N_2$) and there is thus no significant effluent problem in the present process for the production of titanium tetrafluoride.

In particular, the $NH_4F$, normally in aqueous solution, can be converted to $NH_4HF_2$ (and $NH_3$) for example by evaporating the solution at a temperature of 120° to 130°C and the former compound can be reacted with more ferric oxide to form ferric fluoride (as indicated previously). The conversion of $NH_4F$ to $NH_4HF_2$ is, of course, a known reaction.

The reaction products $NH_3$ and $HF$ do, of course, combine to form $NH_4F$ which, as noted above, can be converted by heating to $NH_4HF_2$.

The following Examples show embodiments of the present invention:

EXAMPLE 1

An Australian beach sand ilmenite (16 g.) was preoxidised by heating in air to a temperature of 850°C until it showed no further gain in weight, i.e., until substantially all the iron was in the ferric state. The preoxidised material had a particle size in the range 150 micron to 250 micron, an iron content (expressed as Fe) of 31% and a titanium content (expressed as $TiO_2$) of 54.1%.

The material was mixed with 22 g. of ferric fluoride having a particle size of less than about 1 micron and the mixture was heated to 850°C in a stream of dry air for one hour. Titanium fluoride vapour was evolved from the heated mixture and was recovered by condensation on a cold surface. The yield of titanium tetrafluoride was 11.5 g. i.e., about 91% and the material was of high purity.

A portion of the residue (5.1 g.) was dissolved in 13 g. of molten $NH_4HF_2$ at a temperature of 200°C over a period of 10 minutes and the product was found to consist of 14.3 g. of $(NH_4)_3FeF_6$ and 1.2 g. of unreacted $NH_4HF_2$, after cooling and analysis.

A portion of the $(NH_4)_3FeF_6$ (8.9 g.) prepared as previously described was heated to 700°C in an atmosphere of nitrogen to form 3.27 g. of ferric fluoride and 1.1 g. ferrous fluoride. Another portion of $(NH_4)_3FeF_6$ similarly prepared (11.45 g.) was heated to 700°C under an atmosphere of oxygen to give 3.70 g. of ferric fluoride only (together with 1.46 g. of $Fe_2O_3$). In another experiment 26.8 g. of $(NH_4)_3FeF_6$ was heated first under nitrogen to 700°C and then under oxygen to a similar temperature to produce 12.8 g. ferric fluoride (together with 0.5 $Fe_2O_3$).

EXAMPLE 2

Preoxidised ilmenite (14.7 g.) of the composition and particle size given in Example 1 was mixed with 16 g. of ferric fluoride having a similar particle size to that of Example 1 and the mixture was heated to 850°C for one hour in a stream of nitrogen. The titanium tetrafluoride evolved was recovered by condensing on a cold surface and was found to weigh 10.1 g. and was of high purity.

What is claimed is:

1. A process for the production of titanium tetrafluoride comprising heating together ferric fluoride and an iron-containing titaniferous material selected from the group consisting of ferric oxide containing ilmenite and ferric oxide containing leucoxene and thereafter separately recovering titanium tetrafluoride and ferric oxide.

2. A process as claimed in claim 1 wherein the reactants are heated together to a temperature in the range 500°C to 1,500°C.

3. A process as claimed in claim 2 wherein the reactants are heated together to a temperature in the range 800°C to 1,100°C.

4. A process as claimed in claim 1 wherein the iron-containing titaniferous material is reacted with ferric fluoride vapour.

5. A process as claimed in claim 1 wherein the iron-containing titaniferous material is ilmenite.

6. A process as claimed in claim 1 wherein the ferric oxide is reconverted to ferric fluoride by heating with $NH_4HF_2$ and thereafter heating the reaction product to form ferric fluoride.

7. A process as claimed in claim 6 wherein ferric oxide is heated with $NH_4HF_2$ to a temperature in the range 120°C to 300°C.

8. A process as claimed in claim 7 wherein the ferric oxide is heated with $NH_4HF_2$ to a temperature in the range 150°C to 200°C.

9. A process as claimed in claim 6 wherein the reaction product is heated to a temperature up to 750°C to form ferric fluoride.

10. A process as claimed in claim 9 wherein the reaction product is heated to a temperature up to 500°C to form ferric fluoride.

11. A process as claimed in claim 1 wherein the ferric oxide is reconverted to ferric fluoride by reacting it with aqueous hydrogen fluoride.

12. A process as claimed in claim 6 wherein $NH_4F$ produced by the decomposition of the reaction product of ferric oxide and $NH_4HF_2$ is reconverted to $NH_4HF_2$ by heating in aqueous solution.

13. A process as claimed in claim 12 wherein the aqueous solution of $NH_4F$ is heated to a temperature in the range 120°C to 130°C to form $NH_4HF_2$.

14. A process as claimed in claim 2 wherein the iron-containing titaniferous material is preoxidized.

15. A process for the production of titanium tetrafluoride comprising heating together ferric fluoride and a preoxidised ironcontaining titaniferous material and thereafter separately recovering titanium tetrafluoride and ferric oxide.

16. A process as claimed in claim 5 wherein the material is heated in air to a temperature in the range 700°C to 900°C.

17. A process as claimed in claim 15 wherein the preoxidation is carried out until substantially the whole of the iron is in the ferric state.

* * * * *